(12) United States Patent
Okada

(10) Patent No.: US 7,437,244 B2
(45) Date of Patent: Oct. 14, 2008

(54) OBSTACLE DETECTION APPARATUS AND A METHOD THEREFOR

(75) Inventor: Ryuzo Okada, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 646 days.

(21) Appl. No.: 11/038,239

(22) Filed: Jan. 21, 2005

(65) Prior Publication Data

US 2005/0165550 A1     Jul. 28, 2005

(30) Foreign Application Priority Data

Jan. 23, 2004   (JP)   ............................. 2004-015943

(51) Int. Cl.
*G06T 7/20* (2006.01)
(52) U.S. Cl. .................... 701/301; 701/25; 701/96; 348/699; 348/155; 348/E5.065
(58) Field of Classification Search ................. 701/301; 348/699, 155, E5.065; 382/103, 236
See application file for complete search history.

(56) References Cited

U.S. PATENT DOCUMENTS

| | | | | |
|---|---|---|---|---|
| 4,969,036 A | * | 11/1990 | Bhanu et al. ................ | 348/113 |
| 5,396,426 A | * | 3/1995 | Hibino et al. ................ | 701/96 |
| 5,467,284 A | * | 11/1995 | Yoshioka et al. ........... | 701/301 |
| 5,473,364 A | * | 12/1995 | Burt ........................... | 348/47 |
| 5,594,413 A | * | 1/1997 | Cho et al. ................... | 340/435 |
| 5,777,690 A | * | 7/1998 | Takeda et al. ............... | 348/699 |
| 5,964,822 A | * | 10/1999 | Alland et al. ............... | 701/301 |
| 5,999,092 A | * | 12/1999 | Smith et al. ................ | 340/436 |
| 6,151,539 A | * | 11/2000 | Bergholz et al. ............ | 701/25 |
| 2005/0165550 A1 | * | 7/2005 | Okada ........................ | 701/302 |

FOREIGN PATENT DOCUMENTS

DE  19748405  * 11/1997

(Continued)

OTHER PUBLICATIONS

MARIUS: an automomous underwater vehicle for coastal oceanography, Pascoal, A.; Oliveira, P.; Silvestre, C.; Bjerrum, A.; Ishoy, A.; Pignon, J.-P.; Ayela, G.; Petzelt, C.; Robotics & Automation Magazine, IEEE, vol. 4, Issue 4, Dec. 1997 pp. 46-59, Digital Object Identifier 10.1109/100.637805.*

(Continued)

*Primary Examiner*—Cuong H Nguyen
(74) *Attorney, Agent, or Firm*—Oblon, Spivak, McClelland, Maier & Neustadt, P.C.

(57) ABSTRACT

An obstacle detection apparatus includes an image input unit inputting a image sequence captured by an image sensor, a velocity detector deriving velocity vectors representing motions of a to-be-detected point and a to-be-compared point on each image of the image sequence, a predictive velocity vector calculator calculating a predictive velocity vector of the to-be-detected point using a detected velocity vector of the to-be-compared point, an obstacle detector detecting the to-be-detected point as a point on the obstacle when a horizontal component of a detected velocity vector of the to-be-detected point is larger than a horizontal component of the predictive velocity vector by a given threshold, and an obstacle information output unit outputting information on the to-be-detected point detected as the obstacle.

16 Claims, 10 Drawing Sheets

FOREIGN PATENT DOCUMENTS

| | | | |
|---|---|---|---|
| JP | 2001-6096 | | 1/2001 |
| JP | 2002-112252 | | 4/2002 |
| JP | 2003-30626 | | 1/2003 |
| JP | 2005209019 A | * | 8/2005 |

OTHER PUBLICATIONS

Intelligent autonomous vehicles: recent progress and central research issues, Harris, C.J.; Charnley, D.; Computing & Control Engineering Journal, vol. 3, Issue 4, Jul. 1992 pp. 164-171.*

Discrete-time quasi-sliding mode control of an autonomous underwater vehicle, Pan-Mook Lee; Seok-Won Hong; Yong-Kon Lim; Chong-Moo Lee; Bong-Hwan Jeon; Jong-Won Park; Oceanic Engineering, IEEE Journal of, vol. 24, Issue 3, Jul. 1999 pp. 388-395, Digital Object Identifier 10.1109/48.775300.*

Visually guided micro-aerial vehicle: automatic take off, terrain following, landing and wind reaction, Ruffier, F.; Franceschini, N.; Robotics and Automation, 2004. Proceedings. ICRA '04. 2004 IEEE International Conference on, vol. 3, Apr. 26-May 1, 2004 pp. 2339-2346 vol. 3, Digital Object Identifier 10.1109/ROBOT.2004.1307411.*

NavBelt and the Guide-Cane [obstacle-avoidance systems for the blind and visually impaired], Shoval, S.; Ulrich, I.; Borenstein, J.; Robotics & Automation Magazine, IEEE, vol. 10, Issue 1, Mar. 2003 pp. 9-20, Digital Object Identifier 10.1109/MRA.2003.1191706.*

The NavBelt-a computerized travel aid for the blind based on mobile robotics technology, Shoval, S.; Borenstein, J.; Koren, Y.; Biomedical Engineering, IEEE Transactions on vol. 45, Issue 11, Nov. 1998 pp. 1376-1386, Digital Object Identifier 10.1109/10.725334.*

Auditory guidance with the Navbelt-a computerized travel aid for the blind, Shoval, S.; Borenstein, J.; Koren, Y.; Systems, Man and Cybernetics, Part C, IEEE Transactions on vol. 28, Issue 3, Aug. 1998 pp. 459-467, Digital Object Identifier 10.1109/5326.704589.*

Vehicle and Guard Rail Detection Using Radar and Vision Data Fusion, Alessandretti, G.; Broggi, A.; Cerri, P.; Intelligent Transportation Systems, IEEE Transactions on, vol. 8, Issue 1, Mar. 2007 pp. 95-105, Digital Object Identifier 10.1109/TITS.2006.888597.*

Advance Path Measurement for Automotive Radar Applications, Tsang, S.H.; Hall, P.S.; Hoare, E.G.; Clarke, N.J.; Intelligent Transporation Systems, IEEE Transactions on, vol. 7, Issue 3, Sep. 2006 pp. 273-281, Digital Object Identifier 10.1109/TITS.2006.880614.*

The Single Frame Stereo Vision System for Reliable Obstacle Detection Used during the 2005 DARPA Grand Challenge on, TerraMax, Broggi, A.; Caraffi, C.; Porta, P.P.; Zani, P.; Intelligent Transportation Systems, 2006. Proceedings. 2006 IEEE 2006 pp. 745-752, Digital Object Identifier 10.1109/ITSC.2006.1706831.*

Autonomous Precision Landing and Hazard Detection and Avoidance Technology (ALHAT), Epp, Chirold D.; Smith, Thomas B.; Aerospace Conference, 2007 IEEE, Mar. 3-10, 2007 pp. 1-7, Digital Object Identifier 10.1109/AERO.2007.352724.*

Towards a Practical Stereo Vision Sensor, Bansal, M.; Jain, A.; Camus, T.; Das, A.; Computer Vision and Pattern Recognition, 2005 IEEE Computer Society Conference on, vol. 3, Jun. 20-26, 2005 pp. 63-63, Digital Object Identifier 10.1109/CVPR.2005.543.*

Extracting Terrain Features from Range Images for Autonomous Random Stepfield Traversal, Sheh, Raymond; Kadous, M. Waleed; Sammut, Claude; Hengst, Bernhard; Safety, Security and Rescue Robotics, 2007. SSRR 2007. IEEE International Workshop on, Sep. 27-29, 2007 pp. 1-6, Digital Object Identifier 10.1109/SSRR.2007.4381260.*

Vision-based altitude and pitch estimation for ultra-light indoor microflyers, Beyeler, A.; Mattiussi, C.; Zufferey, J.-C.; Floreano, D.; Robotics and Automation, 2006. ICRA 2006. Proceedings 2006 IEEE International Conference on, May 15-19, 2006 pp. 2836-2841.*

Design and Calibration of a Fast 3D Scanning LADAR, Zhiyu Xiang; Eryong Wu; Mechatronics and Automation, Proceedings of the 2006 IEEE International Conference on, Jun. 25-28, 2006 pp. 211-215, Digital Object Identifier 10.1109/ICMA.2006.257498.*

Artificial vision in road vehicles; Bertozzi, M.; Broggi, A.; Cellario, M.; Fascioli, A.; Lombardi, P.; Porta, M.; Proceedings of the IEEE; vol. 90, Issue 7, Jul. 2002 pp. 1258-1271; Digital Object Identifier 10.1109/JPROC.2002.801444.*

Runway obstacle detection by controlled spatiotemporal image flow disparity; Sull, S.; Sridhar, B.; Robotics and Automation, IEEE Transactions on; vol. 15, Issue 3, Jun. 1999 pp. 537-547; Digital Object Identifier 10.1109/70.768185.*

Surface movement radar data processing methods for airport surveillance; Garcia Herrero, J.; Besada Portas, J.A.; Jimenez Rodriguez, F.J.; Casar Corredera, J.R.; Aerospace and Electronic Systems, IEEE Transactions on; vol. 37, Issue 2, Apr. 2001 pp. 563-585; Digital Object Identifer 10.1109/7.937469.*

An algorithm for distinguishing the types of objects on the road using laser radar and vision; Shimomura, N.; Fujimoto, K.; Oki, T.; Muro, H.; Intelligent Transportation Systems, IEEE Transactions on; vol. 3, Issue 3, Sep. 2002 pp. 189-195 Digital Object Identifier 10.1109/TITS.2002.802928.*

A Passive Approach to Autonomous Collision Detection and AvoidanceAngelov, Plamen; Bocaniala, Cosmin Danut; Xideas, Costas; Patchett, Charles; Ansell, Daren; Everett, Michael; Leng, Gang; Computer Modeling and Simulation, 2008. UKSIM 2008. Tenth International Conference on; Apr. 1-3, 2008 pp. 64-69; Digital Object Identifier 10.1109/UKSIM. 200.*

A Review on Vision-Based Pedestrian Detection for Intelligent Vehicles; Zhenjiang Li; Kunfeng Wang; Li Li; Fei-Yue Wang; Vehicular Electronics and Safety, 2006. ICVES 2006. IEEE International Conference on; Dec. 13-15, 2006 pp. 57-62 Digital Object Identifier 10.1109/ICVES.2006.371554.*

Dynamic Collision Avoidance Path Planning for Mobile Robot Based on Multi-sensor Data Fusion by Support Vector Machine Jingwen Tian; Meijuan Gao; Erhong Lu; Mechatronics and Automation, 2007. ICMA 2007. International Conference on Aug. 5-8, 2007 pp. 2779-2783; Digital Object Identifier 10.1109/ICMA.2007.4303999.*

Spatial Trajectory Tracking Control of Omni-directional Wheeled Robot Using Optical Flow Sensors; Jwu-Sheng Hu; Jung-Hung Cheng; Yung-Jung Chang; Control Applications, 2007. CCA 2007. IEEE International Conference on; Oct. 1-3, 2007; pp. 1462-1467; Digital Object Identifier 10.1109/CCA.2007.4389442.*

Obstacle Avoidance for Autonomous Ground Vehicles in Outdoor Environments; Cellini, M.; Mati, R.; Pollini, L.; Innocenti, M.; Intelligent Vehicles Symposium, 2007 IEEE; Jun. 13-15, 2007 pp. 258-263 ; Digital Object Identifier; 10.1109/IVS.2007.4290124.*

Multirate Obstacle Tracking and Path Planning for Intelligent Vehicles; Mora, M.C.; Piza, R.; Tornero, J.; Intelligent Vehicles Symposium, 2007 IEEE; Jun. 13-15, 2007 pp. 172-177; Digital Object Identifier 10.1109/IVS.2007.4290110.*

Detection and Tracking of Multiple Pedestrians in Automotive Applications; Arndt, R.; Schweiger, R.; Ritter, W.; Paulus, D.; Lohlein, O.; Intelligent Vehicles Symposium, 2007 IEEE; Jun. 13-15, 2007 pp. 13-18; Digital Object Identifier 10.1109/IVS.2007.4290084.*

Tracking objects using a laser scanner in driving situation based on modeling target shape; Fayhad, F.; Cherfaoui, V.; Intelligent Vehicles Symposium, 2007 IEEE; Jun. 13-15, 2007 pp. 44-49; Digital Object Identifier 10.1109/IVS.2007.4290089.*

Fast detection of moving objects in complex scenarios; Rabe, C.; Franke, U.; Gehrig, S.; Intelligent Vehicles Symposium, 2007 IEEE; Jun. 13-15, 2007 pp. 398-403; Digital Object Identifier 10.1109/IVS.2007.4290147.*

Stereo Vision Based Ego-Motion Estimation with Sensor Supported Subset Validation; Horn, J.; Bachmann, A.; Thao Dang; Intelligent Vehicles Symposium, 2007 IEEE; Jun. 13-15, 2007 pp. 741-748; Digital Object Identifier 10.1109/IVS.2007.4290205.*

MILP-based trajectory generation in Relative Velocity Coordinates; Di Zu,; Jianda Han,; Dalong Tan,; Decision and Control, 2007 46th IEEE Conference; on Dec. 12-14, 2007 pp. 1975-1980; Digital Object Identifier 10.1109/CDC.2007.4434566.*

Flying Fast and Low Among Obstacles; Scherer, S.; Singh, S.; Chamberlain, L.; Saripalli, S.; Robotics and Automation, 2007 IEEE International Conference on; Apr. 10-14, 2007 pp. 2023-2029; Digital Object Identifier 10.1109/ROBOT.2007.363619.*

Flexible Formation Control for Obstacle Avoidance Based on Numerical Flow Field; Jinyan Shao; Long Wang; Guangming Xie;

Decision and Control, 2006 45th IEEE Conference on; Dec. 13-15, 2006 pp. 5986-5991; Digital Object Identifier 10.1109/CDC.2006.377193.*

Obstacle avoidance algorithm based on biological patterns for anthropomorphic robot manipulator; Kapela, Rafal; Rybarczyk, Andrzej; IEEE Industrial Electronics, IECON 2006—32nd Annual Conference on; Nov. 2006 pp. 307-312 Digital Object Identifier 10.1109/IECON.2006.347441.*

Collision Avoidance Method of Humanoid Robot Based on Controlling Extended Orbital Energy; Motoi, Naoki; Ohnishi, Kouhei; IEEE Industrial Electronics, IECON 2006—32nd Annual Conference on; Nov. 2006 pp. 3963-3968; Digital Object Identifier 10.1109/IECON.2006.347261.*

Implementation of an Oriented Positioning on a Car-Like Mobile Robot by Fuzzy Control; Ouadah, Noureddine; Ourak, Lamine; Hamerlain, Mustapha; Boudjema, Fares; IEEE Industrial Electronics, IECON 2006—32nd Annual Conference on; Nov. 2006 pp. 4076-4081; Digital Object Identifier 10.1109/IECON.2006.347610.*

Masao Abe, "A motion and control of a car", SAMKAIDO, 1992, pp. 49-66.

Nobuyuki Takeda, et al., "Moving Obstacle Detection using Residual Error of FOE Estimation", Proc. IROS IEEE, 1996, pp. 1642-1647.

Zhencheng Hu, et al., "Real-time Multi Moving Objects Detection and Tracking from Dynamical Road Scene Using FOE", Proc. of $6^{th}$ World Congress on ITS, 1999, (10 Pages).

Pär Fornland, "Direct Obstacle Detection and Motion from Spatio-Temporal Derivatives", Proc. of Int. Conf. on Computer Analysis of Images and Patterns, 1995, (6 Pages).

Nick Pears, et al., "Ground Plane Segmentation for Mobile Robot Visual Navigation", Proc. of IROS, 2001, (6 Pages).

Zhongfei Zhang, et al., "Obstacle Detection Based on Qualitative and Quantitative 3D Reconstruction", IEEE Trans. on PAMI, vol. 19, No. 1, Jan. 1997, pp. 15-26.

Yoshiki Ninomiya, "Moving Objects Detection from Optical Flow", IEICE Technical Report, Japan, the Institute of Electronics,Information and Communication Engineers, May 16, 1997, vol. 97, No. 4, pp. 25-31 (with English Abstract).

* cited by examiner

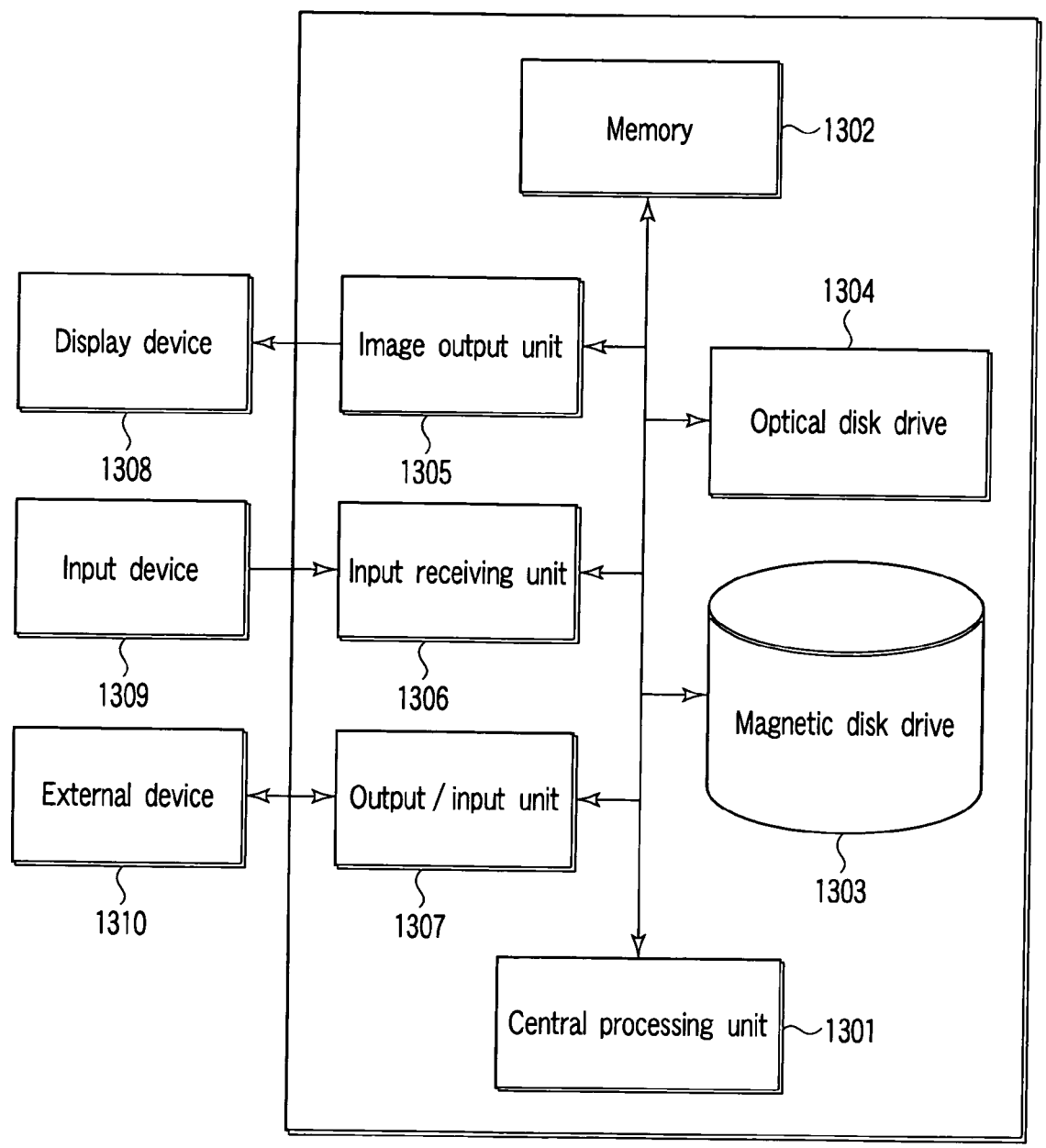
F I G. 13

OBSTACLE DETECTION APPARATUS AND A METHOD THEREFOR

CROSS-REFERENCE TO RELATED APPLICATIONS

This application is based upon and claims the benefit of priority from prior Japanese Patent Application No. 2004-015943, filed Jan. 23, 2004, the entire contents of which are incorporated herein by reference.

BACKGROUND OF THE INVENTION

1. Field of the Invention

The present invention relates to an obstacle detection apparatus to detect an obstacle rushing out ahead of a moving vehicle in a running direction thereof by means of an image of an image sensor installed on the motor machine and a method therefor.

2. Description of the Related Art

As a conventional obstacle detector, an obstacle detector that analyzes a motion vector (optical flow) of ach point of an image is proposed. However, the optical flow varies by running of a moving vehicle on which the obstacle detector is mounted. Therefore, it is difficult to detect an obstacle stably.

A technique to cancel shift of an image caused by pitch and yaw of a moving vehicle is proposed in, for example, Japanese Patent Laid-Open No. 2002-112252. However, there are various movable objects within the image. Therefore, it is difficult to cancel completely the shift due to pitch and yaw of the moving vehicle.

It is an object of the present invention to provide an obstacle detection apparatus to reduce affect of the pitch and yaw that an image sensor mounted on a motor vehicle incurs due to a travel of the moving vehicle, when detecting an obstacle rushing out ahead of the vehicle in a running direction thereof using an image sequence provided from an image sensor mounted on the vehicle.

BRIEF SUMMARY OF THE INVENTION

An aspect of the present invention provides an obstacle detection apparatus using an image sensor installed on a movable object, comprising: an image input unit configured to input an image sequence captured by the image sensor; a velocity detector to derive a plurality of velocity vectors representing motions of at least one to-be-detected point and at least one to-be-compared point on each image of the image sequence; a predictive velocity vector calculator to calculate a predictive velocity vector of the to-be-detected point using a detected velocity vector of the to-be-compared point; a determination unit configured to determine that the to-be-detected point is a point on the obstacle when a horizontal component of a detected velocity vector of the to-be-detected point is larger than a horizontal component of the predictive velocity vector by a given threshold; and an obstacle information output unit to configured to output information on the to-be-detected point determined as the obstacle.

Another aspect of the present invention provides an obstacle detection method comprising: inputting an image sequence captured by an image sensor installed in a vehicle; deriving at least one to-be-detected velocity vector representing movement of at least one to-be-detected point on each picture of the image sequence; calculating a predictive velocity vector of the to-be-detected point using a to-be-compared velocity vector of a to-be-compared point; determining that the to-be-detected point is a point on an obstacle, when a horizontal component of the to-be-detected velocity vector is larger than a horizontal component of the predictive velocity vector by a threshold; and outputting information on the to-be-detected point determined as the obstacle.

BRIEF DESCRIPTION OF THE SEVERAL VIEWS OF THE DRAWINGS

FIG. 13 illustrates an example of a computer system.

DETAILED DESCRIPTION OF THE INVENTION

Figure 1:
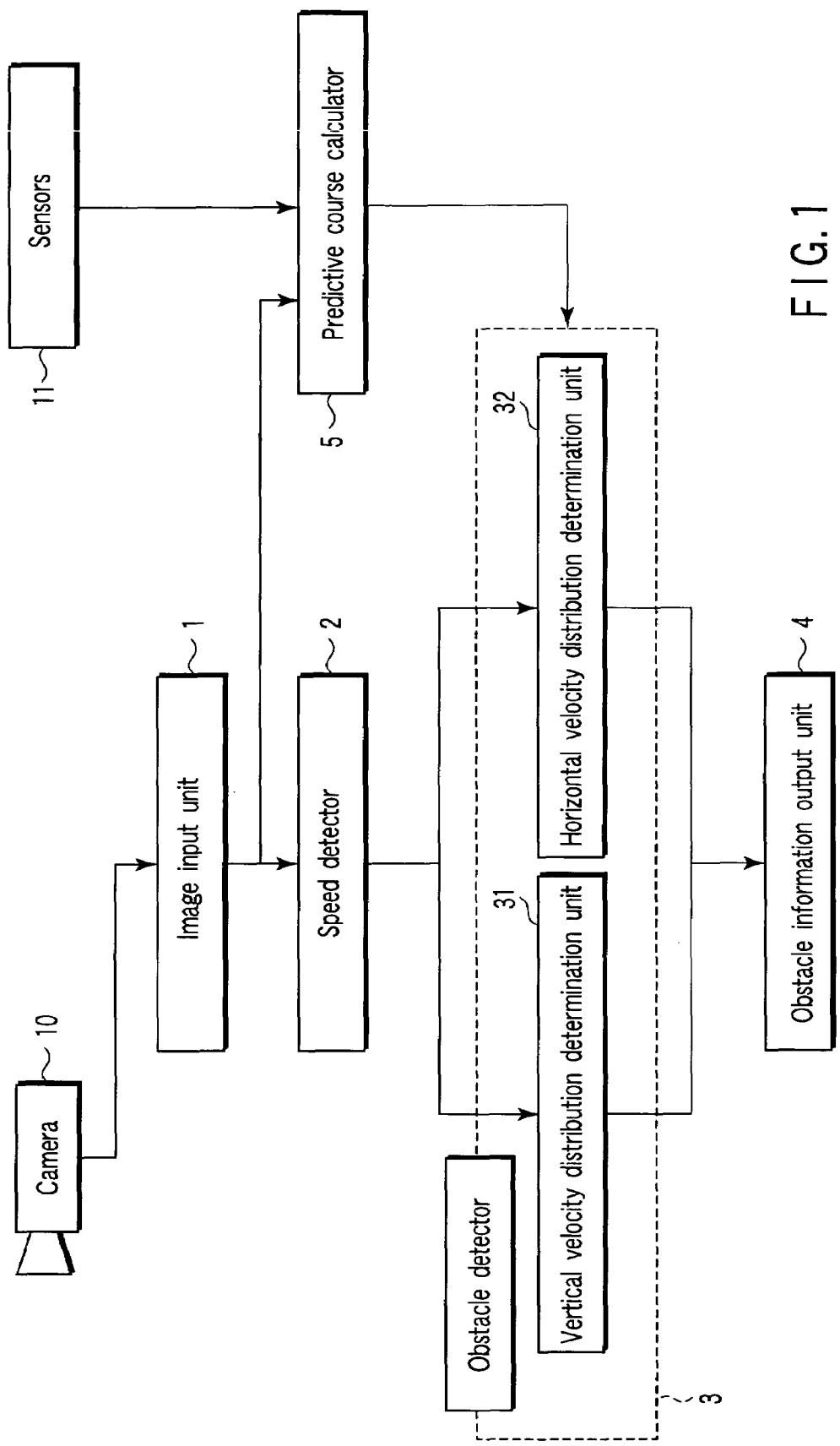
FIG. 1 is a block diagram showing a configuration of an obstacle detection apparatus of one embodiment of the present invention.

There will now be described an obstacle detection apparatus according to an embodiment of the present invention in conjunction with drawings. FIG. 1 shows a configuration of the obstacle detection apparatus.

The obstacle detection apparatus comprises an image input unit 1 to input a video image (an image sequence) captured with a video camera 10, a velocity detector 2 to derive a velocity vector representing velocity information concerning a point or a region on the video image, a predictive course calculator 5 to calculate a predictive course of a moving vehicle (hereinafter referred to as vehicle) on which the apparatus is mounted, an obstacle detector 3 to detect an obstacle based on the predictive course and the velocity vector distribution on the video image, and an obstacle information output unit 4 to derive obstacle information including a vehicle-to-obstacle distance and a vehicle-to-obstacle collision time and output the obstacle information to a controller of the vehicle or a driver.

The obstacle detector 3 comprises a vertical velocity-distribution determination unit 31 to determine an obstacle using a distribution of velocity vectors in the vertical direction and a predictive course of the vehicle, and a horizontal velocity-distribution determination unit 32 to determine the obstacle using a distribution of velocity vectors in a horizontal direction and the predictive course of the vehicle.

Assume that the camera 10 is mounted on the vehicle so as to satisfy the following conditions in this embodiment.

1. A road surface is located at the low position on the video image.

2. The optical axis of the camera 10 is parallel to the running direction of the vehicle going straight.

In the image captured with the camera 10 mounted on the vehicle to satisfy the above two conditions, the horizon is a straight line that is horizontal and passes the center of the image.

In FIG. 1, the camera 10 and the image input unit 1 are separated. However, they may be integrated.

Figure 2:
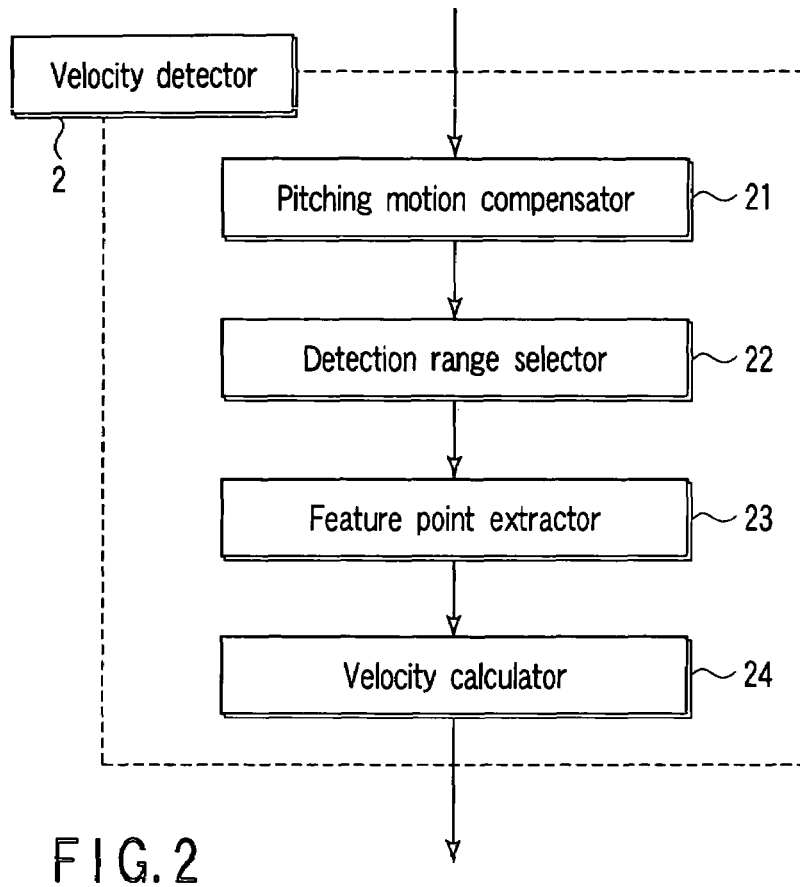
FIG. 2 is a block diagram showing a configuration of a velocity detector 2 of the embodiment of the present invention.

FIG. 2 shows a block diagram of the velocity detector 2. The velocity detector 2 comprises a pitching motion compensator 21 to compensate affect of a pitching motion of the vehicle occurring due to unevenness of a road surface, a detection area selector 22 to select a detection region on the image where obstacles are detected, a feature point extractor 23 to extract a feature point, and a velocity calculator 24 to calculate a velocity vector at the extracted feature point.

The pitching motion compensator 21 removes the shift of the image caused by the pitching of the vehicle. The pitching motion of the vehicle is substantially a rotation motion around the horizontal axis of the camera 10. Thus, the amount of rotation is estimated from the video image, and the image is converted so that the amount of rotation becomes 0.

Various techniques for estimating the amount of rotation from the video image are proposed till now. According to the above document, for example, the rotation motion around the horizontal axis is estimated from a vertical motion appearing in circumference of the horizon using the nature that the vertical motion appearing in circumscription of the horizon occurs by the rotation motion around the horizontal axis of the camera 10.

If the video image input to the image input unit 1 is a video image captured by means of a wide angle lens of a small focal distance, it reduces affect that the pitching motion of the vehicle exerts the image. Therefore, it is possible to configure this apparatus without the pitching motion compensator 21.

The detection area selector 22 selects a region for detecting obstacles. In the present embodiment, the region below a vanishing point is used as a detection region. Other settings of the detection region are as follows.

1. The whole screen is assumed a detection region.

2. The fixed region whose lateral width decreases as it closes to the vanishing point is assumed a detection region.

3. The lane or road on which the vehicle runs is detected by an image process, and the internal region thereof is assumed a detection region.

4. A predictive running course of the vehicle is derived based on measurement values of various sensors 11 acquiring the traveling state of the vehicle such as a steering angle sensor or a gyro, and its circumferential region is assumed a detection region.

The feature point extractor 23 extracts a feature point to derive a stable velocity vector. The feature point is a point whose peripheral area has a brightness distribution different from that of neighborhoods of the area. A corner point is often used for the feature point. Edge detection is performed for the image, and the point at which edges in different directions cross is assumed a feature point.

The velocity calculator 24 calculates the velocity vector Vi of each feature point (Xi, Yi). The velocity vector Vi is derived by a template matching method. However, an existing technique such as a gradient method may be used.

Figure 8:
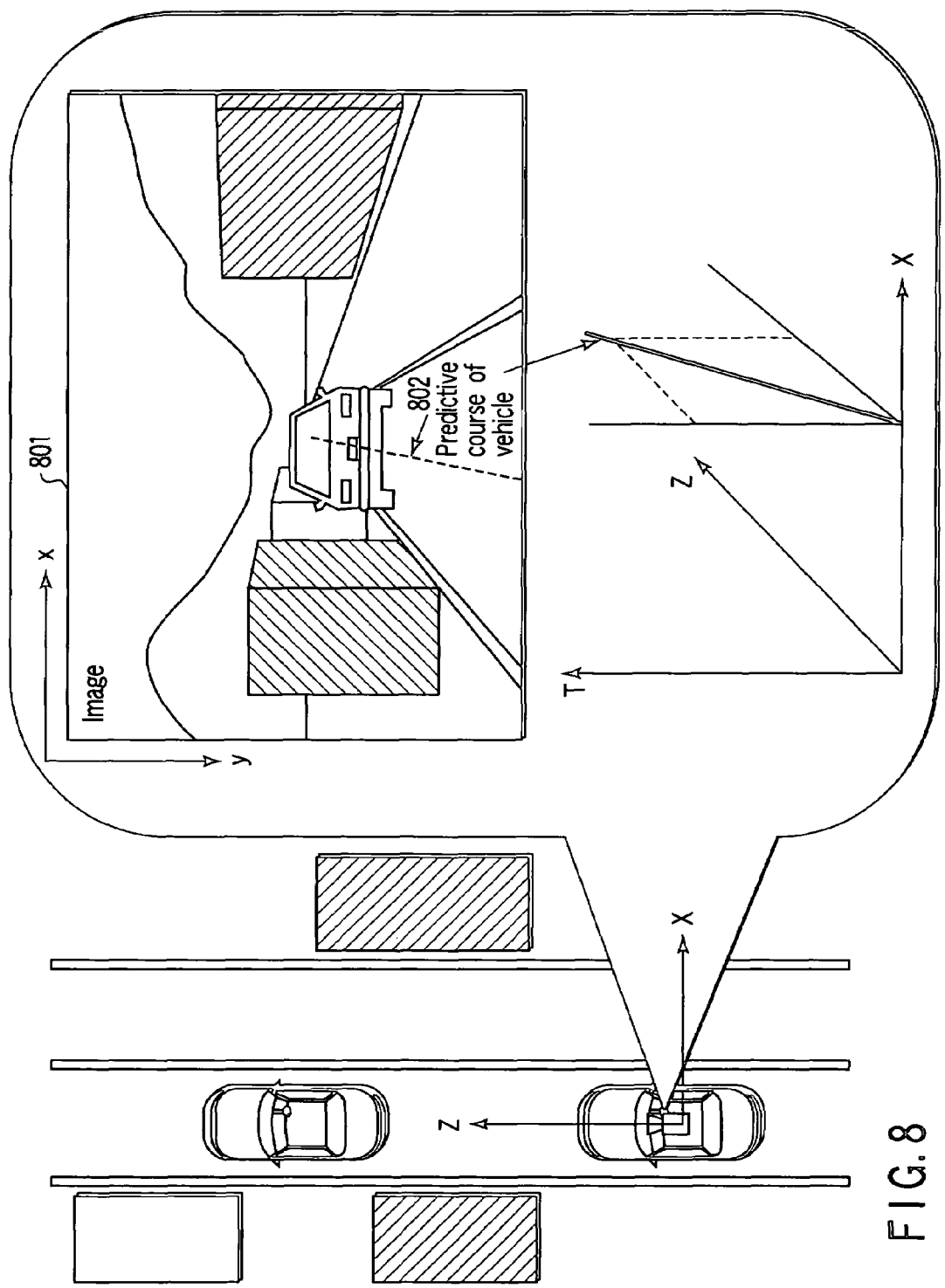
FIG. 8 is a diagram of explaining a predictive course of a vehicle.
Figure 9:
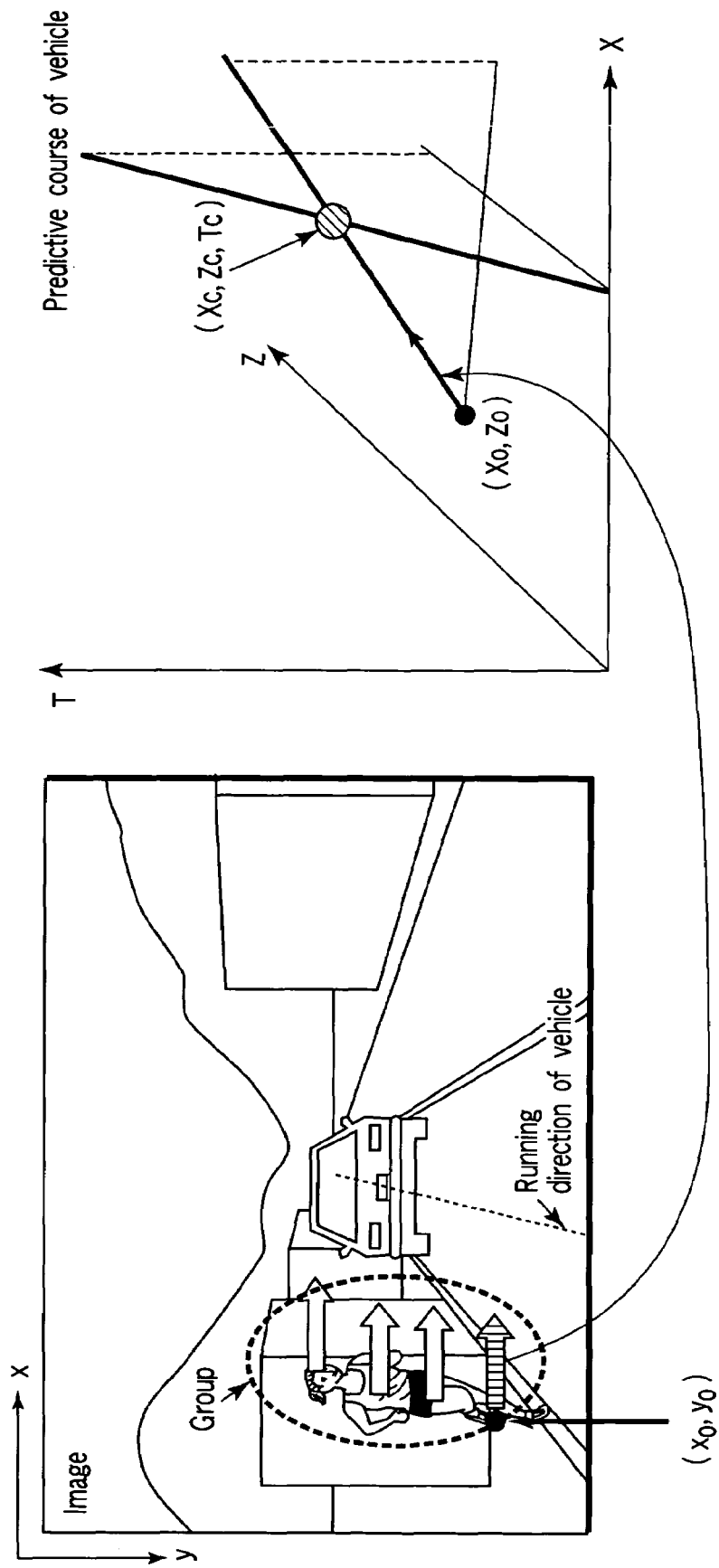
FIG. 9 is a diagram of explaining a vehicle-to-obstacle collision predictive process.

The predictive course calculator 5 computes a predictive course of the vehicle using various sensors 11 such as a steering angle sensor and a speed sensor and the camera 10, which are mounted on the vehicle. Considering a coordinate system whose origin is located at the focal point of the camera 10, Z-axis is the optical axis of the camera 10, and X-axis is parallel to the road surface as shown in FIG. 8, the predictive course is a curve in a three-dimensional space of X-Z-T which is spanned by a time axis (T-axis) to the two spatial axes X and Z.

When information of various sensors 11 such as a rotation angular velocity sensor of a wheel, a steering angle sensor and a speed sensor is used, a predictive course of the vehicle can be derived by a locomotive model of the vehicle (written by Masato Abe, "A motion and control of a car", Samkaido, 1992). The predictive course calculator 5 receives a value from the various sensors 11 mounted on the vehicle, and calculates a predictive course.

The predictive course may be obtained using the image and the speed sensor. The boundary of a lane is detected by means of a technique disclosed in, for example, Japanese Patent Laid-Open No. 2003-30626, and a curve passing through the center of the lane is assumed a predictive course on an image. The predictive course on the image is projected on the road surface based on a geometric relation between the camera 10 and the road surface, which is obtained beforehand. A position in a X-Z plane at each time is predicted using the projected predictive course and information of the speed sensor, to obtain a curve in a three-dimensional space of X-Z-T.

The obstacle detector 3 detects obstacles on the image using the predictive course of the vehicle, which is derived with the predictive course calculator 5 and the velocity of each feature point which is obtained with the velocity detector 2. The obstacle detector 3 comprises a vertical velocity-distribution determination unit 31 and a horizontal velocity-distribution determination unit 32 each detecting an obstacle. The obstacle may be detected with one of the vertical velocity-distribution determination unit 31 and horizontal velocity-distribution determination unit 32.

The vertical velocity-distribution determination unit 31 is described in conjunction with FIGS. 3 and 4 hereinafter. FIG. 4 shows an example for explaining an operation of the vertical velocity-distribution determination unit 31. The vertical velocity-distribution determination unit 31 determines whether or not a to-be-detected pixel (Xi, Yi) is a point on an obstacle.

Figure 3:
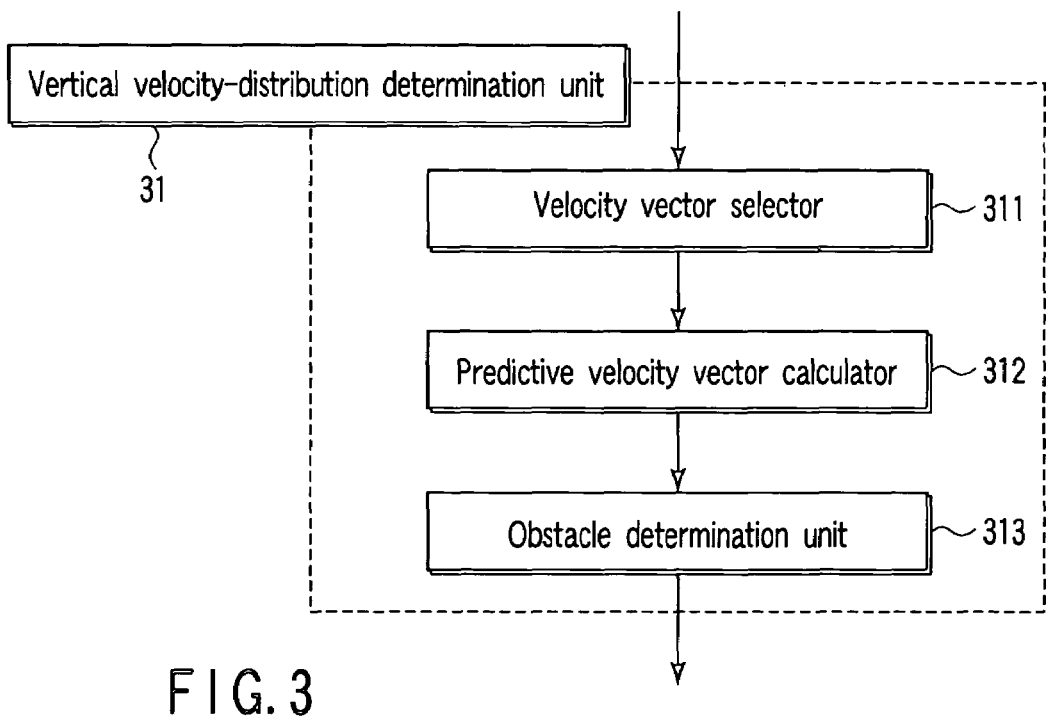
FIG. 3 is a block diagram showing a configuration of a vertical velocity-distribution determination unit 31 of the embodiment of the present invention.
Figure 4:
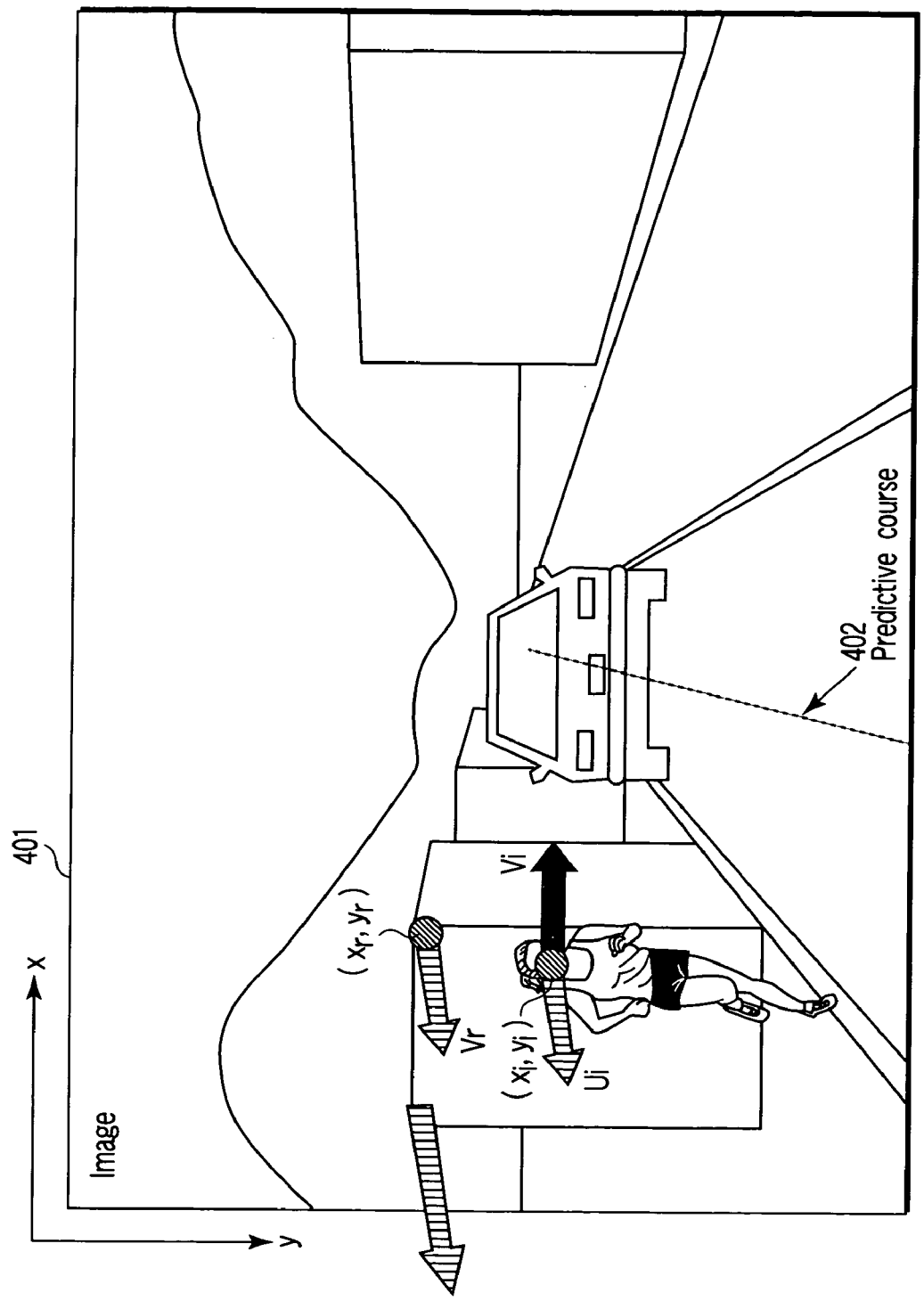
FIG. 4 is a diagram of explaining an obstacle detection method based on a vertical velocity-distribution.

FIG. 3 shows a configuration of the vertical velocity-distribution determination unit 31. The vertical velocity-distribution determination unit 31 comprises a velocity vector selector 311 to select a to-be-compared (reference) velocity vector Vr, a predictive velocity vector calculator 312 to calculate a predictive velocity vector Ui in the to-be-detected pixel (Xi, Yi) assuming a to-be-compared (reference) pixel (Xr, Yr) belongs to a stationary object such as a building, and an obstacle determination unit 313 to determine whether or not the to-be-detected pixel (Xi, Yi) belongs to an obstacle by comparing a predictive velocity vector Ui with a velocity vector Vi of the to-be-detected pixel (Xi, Yi).

Figure 10:
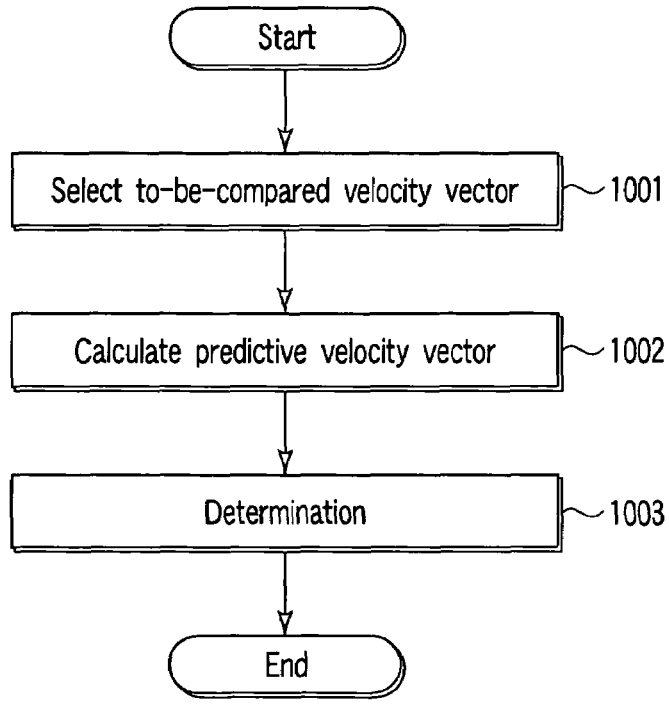
FIG. 10 shows a flowchart of a process of a vertical velocity-distribution determination unit 31 of the embodiment of the present invention.

FIG. 10 shows a flowchart representing a flow of a process of the vertical velocity-distribution determination unit 31.

In step 1001, the velocity vector selector 311 selects the to-be-compared pixel (Xr, Yr) above the to-be-detected pixel (Xi, Yi) on the image whose horizontal position is close to the to-be-compared pixel (FIG. 4 reference).

In step 1002, the predictive velocity vector calculator 312 calculates the predictive velocity vector Ui of the to-be-detected pixel (Xi, Yi) assuming the to-be-compared pixel (Xr, Yr) belongs to a stationary object such as a building. In the case of the camera arrangement of the present embodiment, the building can be approximate to a plane parallel to the image plane. Assuming the to-be-detected pixel (Xi, Yi) and the to-be-compared pixel (Xr, Yr) are on the same plane parallel to the image plane, the predictive velocity vector Ui of the to-be-detected pixel (Xi, Yi) can be derived as follows.

The relative motion of a background with respect to the vehicle is approximate to a translation on a road surface (X-Z plane) and a rotation around the vertical axis (Y-axis).

When the X-, Y-, and Z-axis of a coordinate system of a three-dimensional space are respectively oriented in a right direction, an upper direction, and a depth direction of the image 401, the velocity (vx, vy, vz) of the point (x, y, z) on the background is, using the translational motion (tx, 0, tz) and the rotary motion (0, ry, 0), expressed as follows. Note that each component of the rotation is an angular velocity around the X-axis, an angular velocity around the Y-axis, and an angular velocity around the Z-axis.

$$vx = ryz + tx \quad (1)$$

$$vy = 0 \quad (2)$$

$$vz = -ryx + tz \quad (3)$$

Since the to-be-detected pixel (Xi, Yi) and the to-be-compared pixel (Xr, Yr) are assumed to belong to same plane parallel to the image plane and (Xr, Yr) is selected so that its horizontal position is close to (Xi, Yi), the to-be-detected pixel (Xi, Yi) and the to-be-compared pixel (Xr, Yr) are substantially equal in X-coordinate and Z-coordinate in the three-dimensional space. If the velocities of the to-be-detected pixel (xi, yi) and the to-be-compared pixel (Xr, Yr) in the three-dimensional space are approximately equal, the predictive velocity vector Ui=(Uix, Uiy) is expressed as follows.

$$Uix = Vrx \quad (4)$$

$$Uiy = (Yi/Yr)Vry \quad (5)$$

Vrx and Vry indicate X and Y elements of the vector Vr respectively.

In step 1003, when the velocity vector Vi has a larger component than the predictive velocity vector Ui in a direction approaching the predictive course 402, the obstacle determination unit 313 determines that the to-be-detected pixel (Xi, Yi) is a point on the obstacle.

In the case of FIG. 4, the predictive course 402 of the vehicle is located in the positive direction of the X-axis on the image. When the horizontal component Vix of the velocity vector Vi and the horizontal component Uix of the predictive velocity vector Ui satisfy the relation of the following equation, the obstacle determination unit 313 determines that the to-be-detected pixel (Xi, Yi) is a point on the obstacle.

$$Vix - Uix > Tv \quad (6)$$

Tv is a certain threshold (determined in light of errors such as measurement errors or noise errors).

Figure 5:
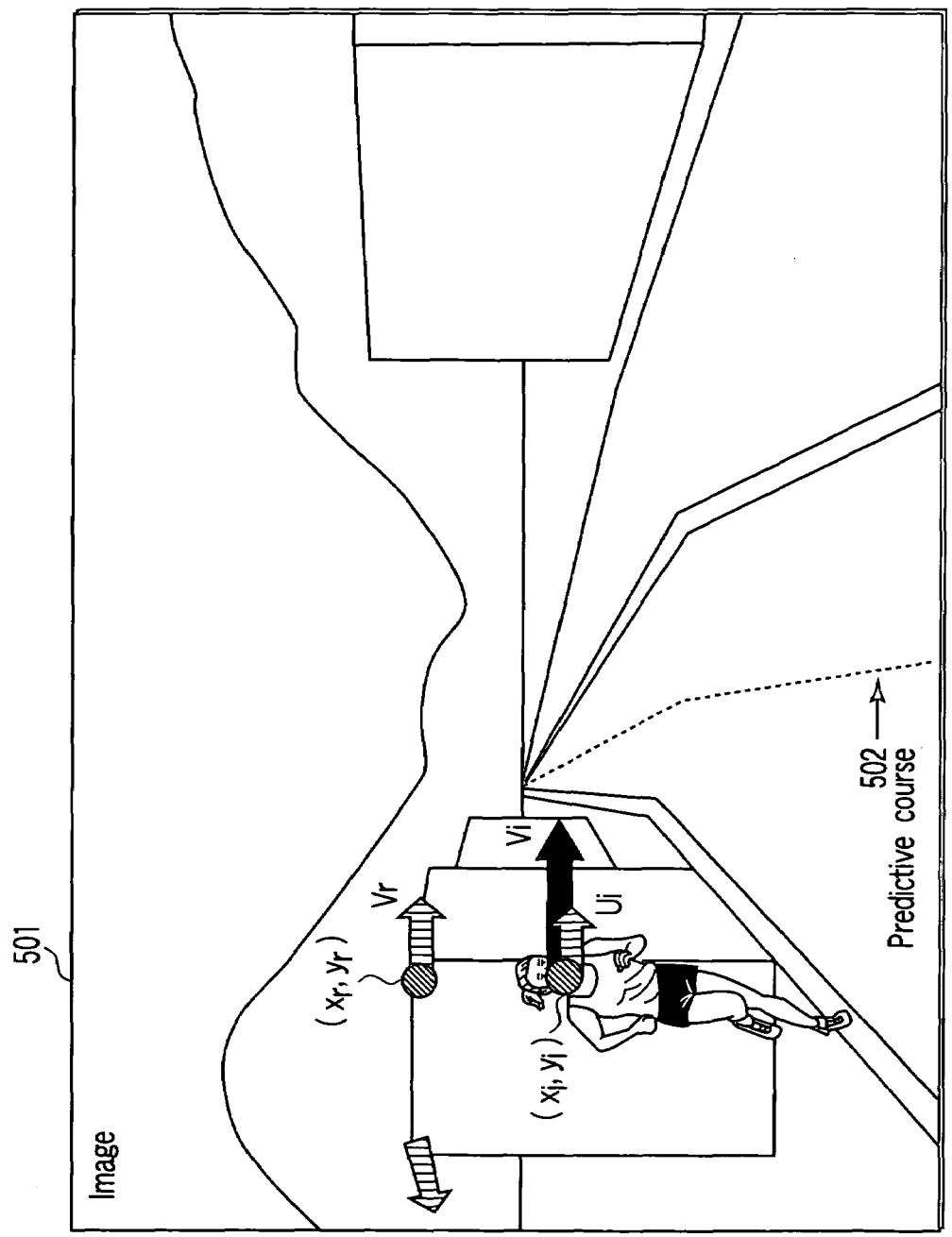
FIG. 5 is a diagram of explaining an obstacle detection method based on a velocity distribution in a vertical direction when a vehicle curves.

An advantage of this obstacle detection technique is to be able to detect an obstacle when the vehicle turns at a curve. FIG. 5 shows an example of a velocity distribution when the vehicle turns at the left curve. Buildings of the background take on movement approaching a predictive course 502, because a shift in a right direction caused by the left turn of the vehicle is added to the whole image. Therefore, a detection error may occur if a point getting closer to the predictive course 502 is simply determined to be on an obstacle. On the contrary, since the difference in velocity between the background and the obstacle is utilized, the present method is not affected by the movement of the vehicle.

The horizontal velocity-distribution determination unit 32 is described in conjunction with FIGS. 6 and 7 hereinafter. FIG. 7 shows an example of an operation of the horizontal velocity-distribution determination unit 32. The horizontal velocity-distribution determination unit 32 determines whether or not the to-be-detected pixel (Xi, Yi) is a point on an obstacle.

Figure 6:
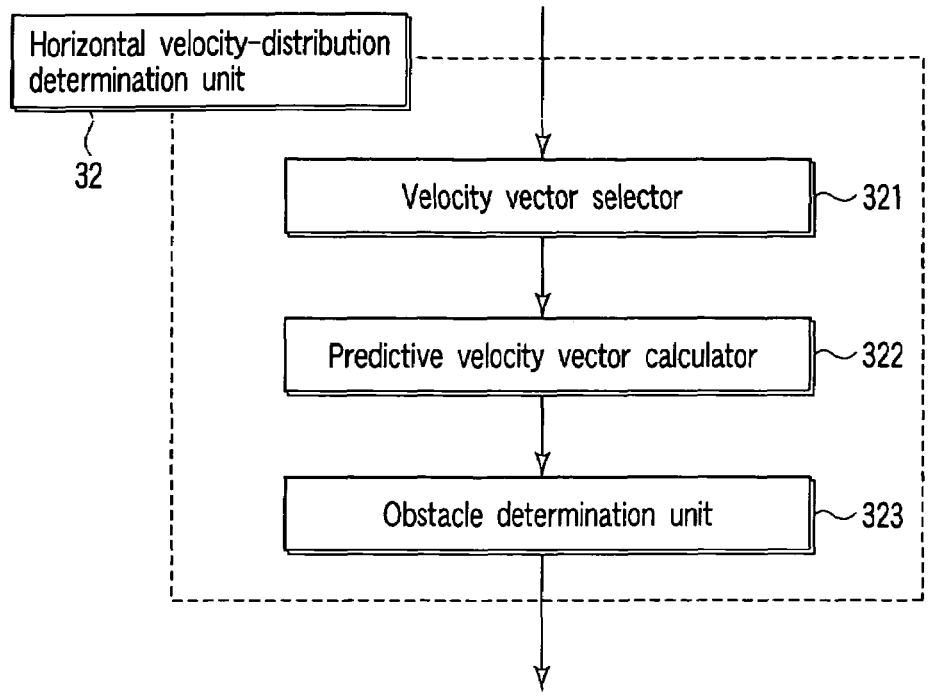
FIG. 6 is a block diagram showing a configuration of a horizontal velocity-distribution determination unit 32 of the embodiment of the present invention.
Figure 7:
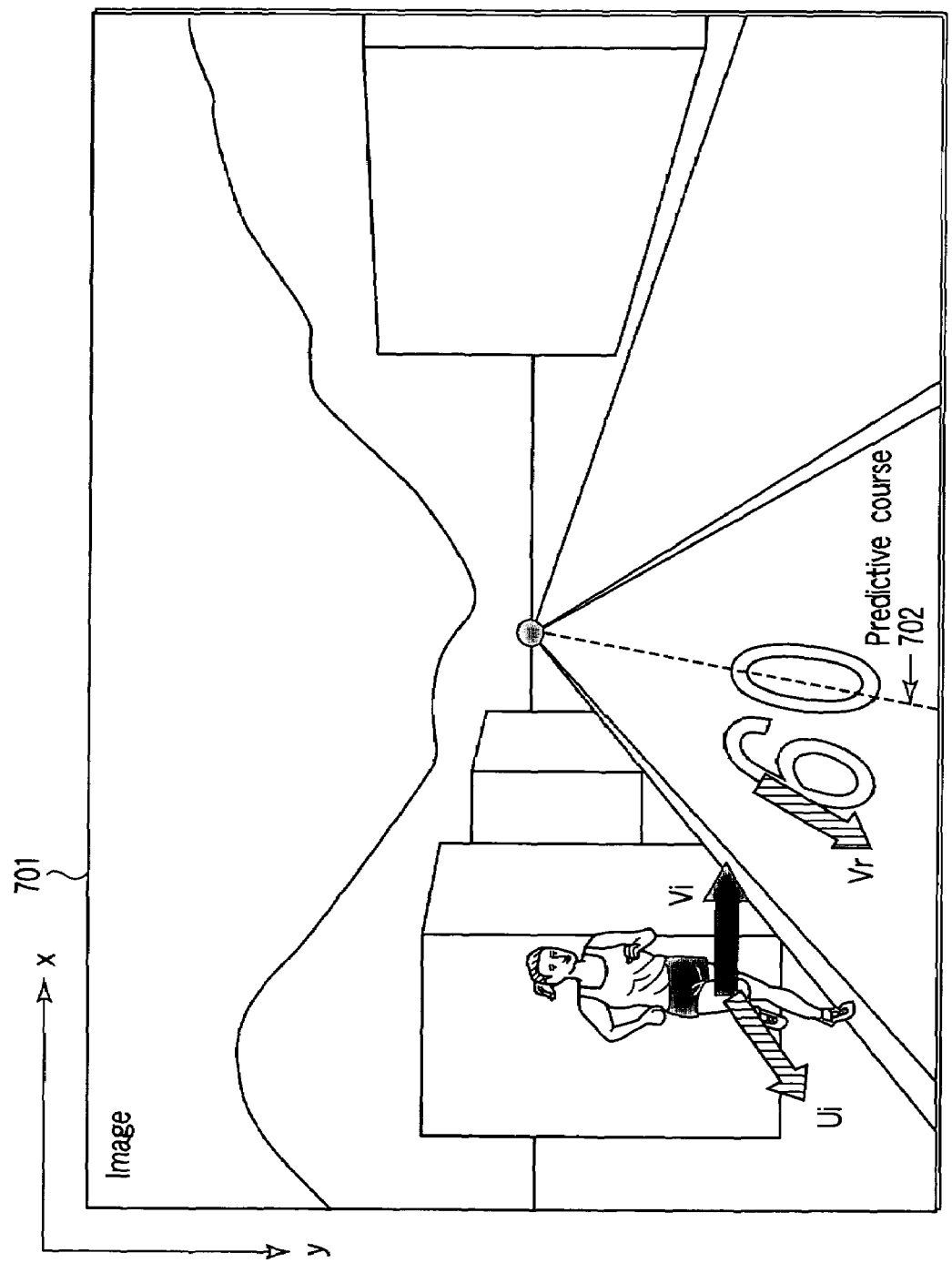
FIG. 7 is a diagram of explaining an obstacle detection method based on a velocity distribution in a horizontal direction.

FIG. 6 shows a configuration of the horizontal velocity-distribution determination unit 32. The horizontal velocity-distribution determination unit 33 comprises a velocity vector selector 321 to select a to-be-compared vector Vr, a predictive velocity vector calculator 322 to calculate a predictive velocity vector Ui in the to-be-detected pixel (Xi, Yi) assuming a to-be-compared (reference) pixel (Xr, Yr) belongs to a stationary object such as a building, and an obstacle determination unit 323 to determine whether or not the to-be-detected pixel (Xi, Yi) belongs to an obstacle by comparing the predictive velocity vector Ui with the velocity vector Vi of the to-be-detected pixel (Xi, Yi).

Figure 11:
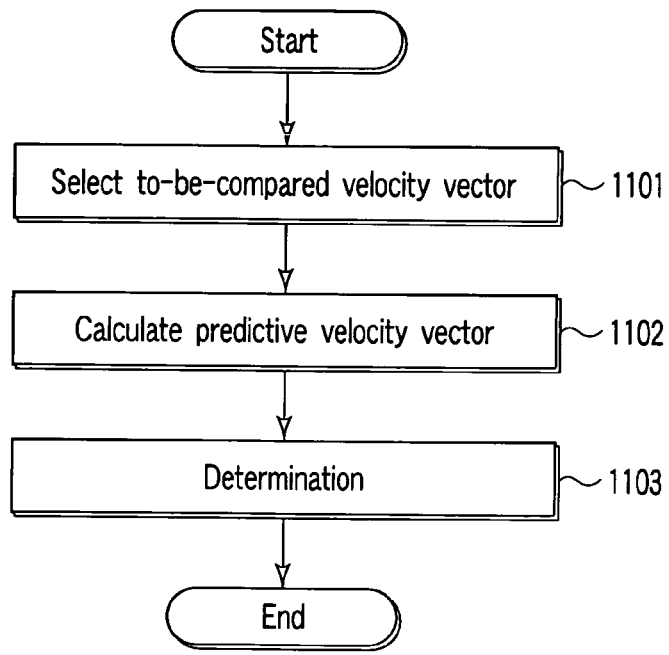
FIG. 11 shows a flowchart of a process of a horizontal velocity-distribution determination unit 31 of the embodiment of the present invention.

FIG. 11 shows a flowchart representing a flow of a process of the horizontal velocity-distribution determination unit 32.

In step 1101, the velocity vector selector 321 selects the to-be-compared pixel (Xr, Yr) around the to-be-detected pixel (Xi, Yi) whose vertical position is close to the to-be-compared pixel (referred to FIG. 7).

In step 1102, assuming the to-be-compared pixel (Xr, Yr) is a feature point on a road surface such as a road marker, the predictive velocity vector calculator 322 calculates a predictive velocity vector Ui of the to-be-detected pixel (Xi, Yi). In the case of the camera position of the present embodiment, the road surface can be approximate to a plane vertical to the image plane. When the to-be-detected pixel (Xi, Yi) and the to-be-compared pixel (Xr, Yr) are assumed a point on the road surface, the predictive velocity vector Ui of the to-be-detected pixel (Xi, Yi) can be obtained as follows.

The relative motion of the background with respect to the vehicle is approximate to a translation on a road surface (X-Z plane) and a rotation around the vertical axis (Y-axis).

When the X-, Y-, and Z-axis of a coordinate system of a three-dimensional space are respectively oriented in a right direction, an upper direction, and a depth direction of the image 401, the velocity (vx, vy, vz) of the point (x, y, z) on the background is, using the translational motion (tx, 0, tz) and the rotary motion (0, ry, 0), expressed as follows. Note that each component of the rotation is an angular velocity around the X-axis, an angular velocity around the Y-axis, and an angular velocity around the Z-axis.

$$vx = ryz + tx \quad (7)$$

$$vy = 0 \quad (8)$$

$$vz = -ryx + tz \quad (9)$$

Since the to-be-detected pixel (Xi, Yi) and the to-be-compared pixel (Xr, Yr) are assumed to belong to a point on a road surface, that is, a point on the same plane vertical to the image plane and (Xr, Yr) is selected so that its vertical position is close to (Xi, Yi), the to-be-detected pixel (Xi, Yi) and the to-be-compared pixel (Xr, Yr) are approximately equal in Y-coordinate and Z-coordinate in the three-dimensional space. The velocities of the to-be-detected pixel (Xi, Yi) and the to-be-compared pixel (Xr, Yr) in the three-dimensional space are approximately equal from equations (7), (8) and (9). In this case, the predictive velocity vector Ui=(Uix, Uiy) is expressed as follows.

$$Uix=Vrx+(Vry/Yr)(Xr-Xi) \quad (10)$$

$$Uiy=Vry \quad (11)$$

Vrx and Vry indicate a X and Y element of the detected velocity vector Vr respectively.

In step 1103, when the velocity vector Vi has a larger component than the predictive velocity vector Ui in a direction approaching the predictive course 402, the obstacle determination unit 323 determines that the to-be-detected pixel (Xi, Yi) is a point on the obstacle.

In the case of FIG. 7, the predictive course 702 of the vehicle is located in the positive direction of the X-axis on the image. When the horizontal component Vix of the velocity vector Vi and the horizontal component Ui of the predictive velocity vector Ui satisfy the relation of the following equation, the obstacle determination unit 323 determines that the to-be-detected pixel (Xi, Yi) is a point on the obstacle.

$$Vix-Uix>Tv \quad (12)$$

Tv is a certain threshold.

Similarly to the vertical velocity-distribution determination unit 31, the horizontal velocity-distribution determination unit 32 is not affected by the movement of the vehicle, because a difference in velocity between the background and the obstacle is utilized.

Figure 12:
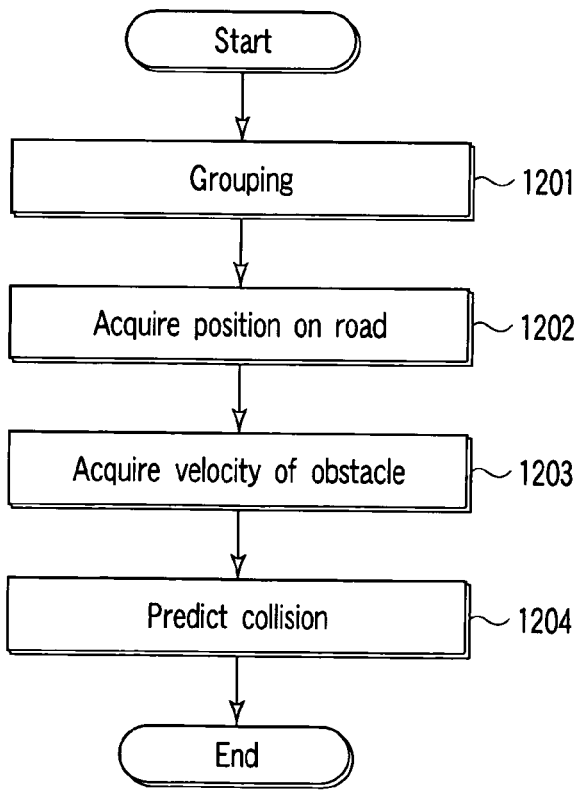
FIG. 12 shows a flowchart of a process of an obstacle information output unit 4 of the embodiment of the present invention.

The obstacle information output unit 4 calculates position information, velocity information and a vehicle-to-object collision time with respect to the obstacle detected by the obstacle detector 3, and output them. FIG. 12 shows a flowchart for explaining a flow of a process of the obstacle information output unit 4.

In step 1201, the obstacle information output unit 4 groups the velocity vectors concerning points of the obstacles detected by the obstacle detector 3 and resembling in position and velocity vector. Whether or not the velocity vectors resemble in position is determined based on a distance between two points. Whether or not the velocity vectors resemble in velocity vector is determined by a difference between the velocity vectors.

In the case of, for example, two points, if the distance is less than a threshold J and the difference between the velocity vectors is less than a threshold K, they are determined to belong to a same group A. The difference between two velocity vectors is defined to be a sum of absolute difference of each element.

If the distance between a new point P and a point S belonging to a group A is less than the threshold J, and a difference between the velocity vectors of the point P and the point S is less than the threshold K, it is determined that the point P belongs to the group A.

In step 1202, the obstacle information output unit 4 supposes that the point (Xo, Yo) located at the lowest position on the image out of points belonging to the same group is a point where an obstacle touches a road surface, and derives a position (xo, zo) of the obstacle on the road surface. If the position of the obstacle on the image is obtained, the position of the obstacle on the road surface can be computed from a geometric relation between the camera 10 and the road surface and the inner parameters of the camera 10 such as focal length.

The camera 10 is directed toward a direction parallel to the running direction of the vehicle. If the camera 10 is installed on a location of height h from a road surface, the road surface is a plane (Y=−h) vertical to the image plane.

When the focal length of the camera 10 is assumed to be f, the following relational expression is satisfied.

$$(xo,zo)=(-(Xoh)/Yo,-(fh)/Yo) \quad (13)$$

The obstacle information output unit 4 derives the position of the obstacle on the road surface by the equation (13).

In step 1203, the obstacle information output unit 4 derives a velocity Vo=(Vox, Voy) of the obstacle on the image using an average of horizontal and vertical components of the velocity vector of each point belonging to each group. A mode or a median may be used instead of the average. The obstacle information output unit 4 uses the position (Xo, Yo) and the velocity Vo on this image and computes the velocity vo=(vox, 0, voz) of each obstacle on the road surface based on a known geometric relation between the camera 10 and the road surface.

$$vox=(Zo^2/f)(Vox-(VoyXo)/h) \quad (14)$$

$$voz=-(VoyZo^2)/(fh) \quad (15)$$

In step 1204, the obstacle information output unit 4 derives a predictive course of the obstacle in the X-Z-T space using the velocity vo of the obstacle on the road surface. The predictive course of the obstacle is obtained on the assumption that the obstacle has a constant velocity or a constant acceleration. A coordinate (Xc, Zc, Tc) at which the predictive course of the obstacle and the predictive course 802 of the vehicle in FIG. 8 crosses is obtained. The obstacle information output unit 4 outputs a result that the vehicle collides with the obstacle at the position (Xc, Zc) viewed from the vehicle at the time Tc.

Since the predictive course of the obstacle and the predictive course of the vehicle cross rarely in an actual case, it is determined that collision occurs when the distance between the predictive course of the obstacle and the predictive course of the vehicle is less than the threshold M. Even if the distance is not less than the threshold M, if it is less than a threshold N larger than the threshold M, the result that the vehicle approaches abnormally the obstacle may be output.

There are various output methods. For example, it may be notified in speech, or may be displayed on a display device. The obstacle detection result may be output to a collision avoidance system of a car to do a braking or steering control.

The obstacle detection apparatus of the present embodiment may be realized as a program to execute a part thereof or all on a computer. In other words, the apparatus may be realized by a program to cause the computer to execute a function of each part described above.

FIG. 13 shows a block diagram of an example of a computer system. This computer system comprises a CPU 1301 executing a program, a memory 1302 storing the program and data processing, a magnetic disk drive 1303 storing a program and so on, and an optical disk drive 1304.

Further, the computer system comprises an image output unit 1305 which is an interface for outputting an image, an input receive unit 1306 which is an interface to receive an input from a key-board or a mouse, an input/output unit 1307 which is a connection interface with an external equipment such as USB (Universal Serial Bus) or an interface such as a network connection, a display device 1308 such as LCD or CRT, an input devices 1309 such as a key-board or a mouse, and an external device 1310 such as a camera or other computers.

In the above configuration, the optical disk driving 1304 may be omitted. The magnetic disk drive 1303 may be replaced with a nonvolatile memory such as a flash memory or EEPROM.

According to the present invention, when detecting an obstacle jumping out ahead of the vehicle in a running direction, using a video image provided from an image sensor installed on a motor machine such as a vehicle, affect of the oscillation that the image sensor catches by motion of the vehicle can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An obstacle detection apparatus using an image sensor installed on a movable object, comprising:
   an image input unit configured to input an image sequence captured by the image sensor;
   a velocity detector to derive a plurality of velocity vectors representing motions of at least one to-be-detected point and at least one to-be-compared point on each picture of the image sequence;
   a predictive velocity vector calculator to calculate a predictive velocity vector of the to-be-detected point using a detected velocity vector of the to-be-compared point;
   an obstacle detector to detect the to-be-detected point as a point on an obstacle when a horizontal component of a detected velocity vector of the to-be-detected point is larger than a horizontal component of the predictive velocity vector by a given threshold; and
   an obstacle information output unit to output information on the to-be-detected point detected as the point of the obstacle.

2. The apparatus according to claim 1, wherein the velocity detector is configured to detect a velocity vector of a point of a movable obstacle that corresponds to the to-be-detected point and a velocity vector of a point of a non-movable object that corresponds to the to-be-compared point.

3. The apparatus according to claim 1, wherein the movable object includes a vehicle running a road.

4. The apparatus according to claim 1, which further comprises a predictive course calculator to calculate a predictive course of the movable object on the picture, and
   the obstacle detector includes an obstacle point detector to detect the to-be-detected point as the point on the obstacle when the horizontal component of the to-be-detected velocity vector is larger than the horizontal component of the predictive velocity vector by the threshold in a direction approaching the predictive course from a position of the to-be-detected point.

5. The apparatus according to claim 4, wherein the predictive velocity vector calculator is configured to calculate the predictive velocity vector, using the velocity vector of the to-be-compared point that is upward the to-be-detected point on the picture and has a horizontal position difference less than another threshold with respect to the to-be-detected point.

6. The apparatus according to claim 4, wherein the predictive velocity vector calculator is configured to calculate the predictive velocity vector, using the velocity vector of the to-be-compared point that is on a side of the predictive course other than the to-be-detected point on the picture and has a vertical position difference less than a further threshold with respect to the to-be-detected point.

7. The apparatus according to claim 4, wherein the velocity detector includes a pitching motion detector to detect a pitching motion of the movable object from the image sequence, and a pitching motion compensator to compensate affect of the pitching motion for each picture.

8. The apparatus according to claim 4, wherein the velocity detector includes a detection region setting unit configured to set on the picture a detection region from which the to-be-detected point is selected, and a feature point deriving unit configured to derive a feature point in the detection region to determine the feature point as the to-be-detected point.

9. The apparatus according to claim 4, wherein the predictive course calculator is configured to calculate another predictive course including time information of the movable object on a plane on which the movable object moves, and the obstacle information output unit includes means for calculating a position and a time that a distance between the movable object and the obstacle becomes not more than a threshold, using the velocity vector of the obstacle detected by the obstacle detector and the another predictive course.

10. The apparatus according to claim 4, wherein the obstacle information output unit comprises a grouping unit configured to group to-be-detected points that are determined as the obstacle by using positions of the points and to-be-detected velocity vectors corresponding thereto, and means for calculating a position of the obstacle viewed from the movable object, using a geometric relation between the image sensor and a plane on which the movable object moves and a position of the to-be-detected point which is located at the lowest position on the picture in the to-be-detected points belonging to the same group.

11. The apparatus according to claim 4, wherein the velocity detector is configured to detect a velocity vector of a point of a movable obstacle that corresponds to the to-be-detected point and a velocity vector of a point of a non-movable object that corresponds to the to-be-compared point.

12. The apparatus according to claim 4, wherein the movable object includes a vehicle running a road.

13. An obstacle detection apparatus using an image sensor installed on a movable object, comprising:
   an image input unit configured to input a image sequence captured by the image sensor;
   a velocity detector to derive a plurality of velocity vectors representing motions of a plurality of to-be-detected points and a plurality of to-be-compared points on each picture of the image sequence;
   a predictive velocity vector calculator to calculate a predictive velocity vector of each of the to-be-detected points using a detected velocity vector of each of the to-be-compared points;
   an obstacle detector to detect each of the to-be-detected point as a point on a corresponding obstacle when a horizontal component of a detected velocity vector of each of the to-be-detected points is larger than a horizontal component of the predictive velocity vector by a given threshold; and
   an obstacle information output unit to output information on the to-be-detected points each detected as the point of the corresponding obstacle.

14. The apparatus according to claim 13, wherein the velocity detector is configured to detect a velocity vector of a point of a movable obstacle that corresponds to the to-be-detected point and a velocity vector of a given point of a non-movable object that corresponds to the to-be-compared point.

15. The apparatus according to claim 13, which further comprises a predictive course calculator to calculate a predictive course of the movable object on the picture, and the obstacle detector includes an obstacle point detector to detect the to-be-detected point as the point on the obstacle when the horizontal component of each of the to-be-detected velocity vectors is larger than the horizontal component of the predictive velocity vector by the threshold in a direction approaching the predictive course from a position of the to-be-detected point.

16. The apparatus according to claim 13, wherein the predictive velocity vector calculator is configured to calculate the predictive velocity vector, using the velocity vector of the to-be-compared point that is upward the to-be-detected point on the picture and has a horizontal position difference less than another threshold with respect to the to-be-detected point.

* * * * *